US012200419B2

(12) United States Patent
Wang et al.

(10) Patent No.: US 12,200,419 B2
(45) Date of Patent: Jan. 14, 2025

(54) ACOUSTIC TUBE AND HEARING DEVICE SYSTEM INCLUDING SAME

(71) Applicant: STARKEY LABORATORIES, INC., Eden Prairie, MN (US)

(72) Inventors: John Wang, Eden Prairie, MN (US); Yoshi Kasahara, Eden Prairie, MN (US); Gregory J. Haubrich, Champlin, MN (US)

(73) Assignee: STARKEY LABORATORIES, INC., Eden Prairie, MN (US)

( * ) Notice: Subject to any disclaimer, the term of this patent is extended or adjusted under 35 U.S.C. 154(b) by 219 days.

(21) Appl. No.: 18/076,454

(22) Filed: Dec. 7, 2022

(65) Prior Publication Data

US 2023/0179899 A1 Jun. 8, 2023

Related U.S. Application Data

(60) Provisional application No. 63/286,773, filed on Dec. 7, 2021.

(51) Int. Cl.

| | |
|---|---|
| ***H04R 1/08*** | (2006.01) |
| ***F21V 33/00*** | (2006.01) |
| ***G10K 11/22*** | (2006.01) |
| ***H04R 1/10*** | (2006.01) |

(52) U.S. Cl.

CPC ......... *H04R 1/083* (2013.01); *F21V 33/0056* (2013.01); *G10K 11/22* (2013.01); *H04R 1/1016* (2013.01); *H04R 1/1066* (2013.01); *H04R 1/1091* (2013.01)

(58) Field of Classification Search

CPC .... H04R 1/083; H04R 1/1016; H04R 1/1066; H04R 1/1091

See application file for complete search history.

(56) References Cited

U.S. PATENT DOCUMENTS

| | | | | |
|---|---|---|---|---|
| 3,573,395 | A * | 4/1971 | Whitmore ............. | H04R 1/083 381/189 |
| 6,560,346 | B2 | 5/2003 | Ohta et al. | |
| 7,856,111 | B2 | 12/2010 | Balke et al. | |
| 8,477,973 | B2 | 7/2013 | Merks | |
| 8,948,430 | B2 | 2/2015 | Nielsen | |
| 8,949,430 | B2 | 2/2015 | Mueller et al. | |
| 9,654,854 | B2 * | 5/2017 | Darlington ............. | H04R 1/083 |
| 2012/0052924 | A1 * | 3/2012 | Cybart ................ | H04R 1/1066 455/569.1 |

(Continued)

*Primary Examiner* — Suhan Ni

(74) *Attorney, Agent, or Firm* — Mueting Raasch Group

(57) ABSTRACT

Various embodiments of an acoustic tube and a hearing device system that includes an acoustic tube are disclosed. The acoustic tube includes a body, a lumen disposed within the body that extends along a lumen axis between a first end and a second end of the body, and a magnetic coupler disposed adjacent to the first end and adapted to connect the acoustic tube to a housing of a hearing device. The acoustic tube further includes an outlet disposed adjacent to the first end and acoustically connected to the lumen, where the outlet is adapted to be acoustically connected to a microphone of the hearing device; and an inlet disposed adjacent to the second end and acoustically connected to the lumen. The acoustic tube is adapted to direct acoustic energy received by the inlet through the lumen and the outlet to the microphone of the hearing device.

20 Claims, 11 Drawing Sheets

(56) References Cited

U.S. PATENT DOCUMENTS

| | | | | |
|---|---|---|---|---|
| 2015/0365749 | A1 | 12/2015 | Lyvers et al. | |
| 2021/0168489 | A1 * | 6/2021 | Zhang | H04R 1/1091 |
| 2021/0337287 | A1 * | 10/2021 | Li | H04R 1/1066 |

* cited by examiner

ACOUSTIC TUBE AND HEARING DEVICE SYSTEM INCLUDING SAME

This application claims the benefit of U.S. Provisional Application No. 63/286,773, filed Dec. 7, 2021, the disclosure of which is incorporated by reference herein in its entirety.

BACKGROUND

Wireless ear-worn hearing devices such as earpieces and headphones have been used for two-way Bluetooth audio links with smart phones and other digital devices. Such devices can include a boom microphone permanently attached to a housing of the device or have an elongated housing that can enable an own-voice microphone to be placed closer to a user's mouth. Placement of the microphone closer to the user's mouth can improve detection and processing of the user's voice and the quality of such voice in an acoustic output provided to the user by a receiver (i.e., speaker) of the device that is disposed adjacent to the user's ear.

SUMMARY

In general, the present disclosure provides various embodiments of an acoustic tube and a hearing device system that includes such tube. The acoustic tube can include a magnetic coupler that is adapted to connect the acoustic tube to a housing of a hearing device of the system. The acoustic tube can also include a body and a lumen disposed within the body. An inlet can be disposed adjacent to an end of the body that is acoustically connected to the lumen. The inlet can be adapted to receive acoustic energy from a mouth of a user and direct such acoustic energy from the inlet and through the lumen and an outlet of the acoustic tube to a microphone that can be acoustically connected to the outlet.

In one aspect, the present disclosure provides an acoustic tube that includes a body having a first end and a second end, a lumen disposed within the body that extends along a lumen axis between the first end and second end, and a magnetic coupler disposed adjacent to the first end of the body and adapted to connect the acoustic tube to a housing of a hearing device. The acoustic tube further includes an outlet disposed adjacent to the first end of the body and acoustically connected to the lumen, where the outlet is adapted to be acoustically connected to a microphone of the hearing device; and an inlet disposed adjacent to the second end of the body and acoustically connected to the lumen. The inlet is adapted to receive acoustic energy from a mouth of a user. The acoustic tube is adapted to direct the acoustic energy received by the inlet through the lumen and the outlet to the microphone of the hearing device.

In another aspect, the present disclosure provides a hearing device system that includes a hearing device having a housing and a microphone disposed within the housing and an acoustic tube acoustically connected to the microphone. The acoustic tube includes a body having a first end and a second end, a lumen disposed within the body that extends along a lumen axis between the first end and second end, and a magnetic coupler disposed adjacent to the first end of the body and adapted to connect the acoustic tube to the housing of the hearing device. The acoustic tube further includes an outlet disposed adjacent to the first end of the body and acoustically connected to the lumen, where the acoustic tube is acoustically connected to the microphone through the outlet; and an inlet disposed adjacent to the second end of the body and acoustically connected to the lumen. The inlet is adapted to receive acoustic energy from a mouth of a user. Further, the acoustic tube is adapted to direct the acoustic energy received by the inlet through the lumen and the outlet to the microphone of the hearing device.

In another aspect, the present disclosure provides a method that includes magnetically connecting an acoustic tube to a housing of a hearing device such that an outlet of the acoustic tube is acoustically connected to a microphone disposed within the housing, positioning an inlet of the acoustic tube adjacent to a mouth of a user, and directing acoustic energy from the mouth of the user from the inlet of the acoustic tube to the microphone through the outlet of the acoustic tube.

All headings provided herein are for the convenience of the reader and should not be used to limit the meaning of any text that follows the heading, unless so specified.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. The term "consisting of" means "including," and is limited to whatever follows the phrase "consisting of." Thus, the phrase "consisting of" indicates that the listed elements are required or mandatory and that no other elements may be present. The term "consisting essentially of" means including any elements listed after the phrase and is limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

These and other aspects of the present disclosure will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

Throughout the specification, reference is made to the appended drawings, where like reference numerals designate like elements, and wherein.

DETAILED DESCRIPTION

Figure 1:
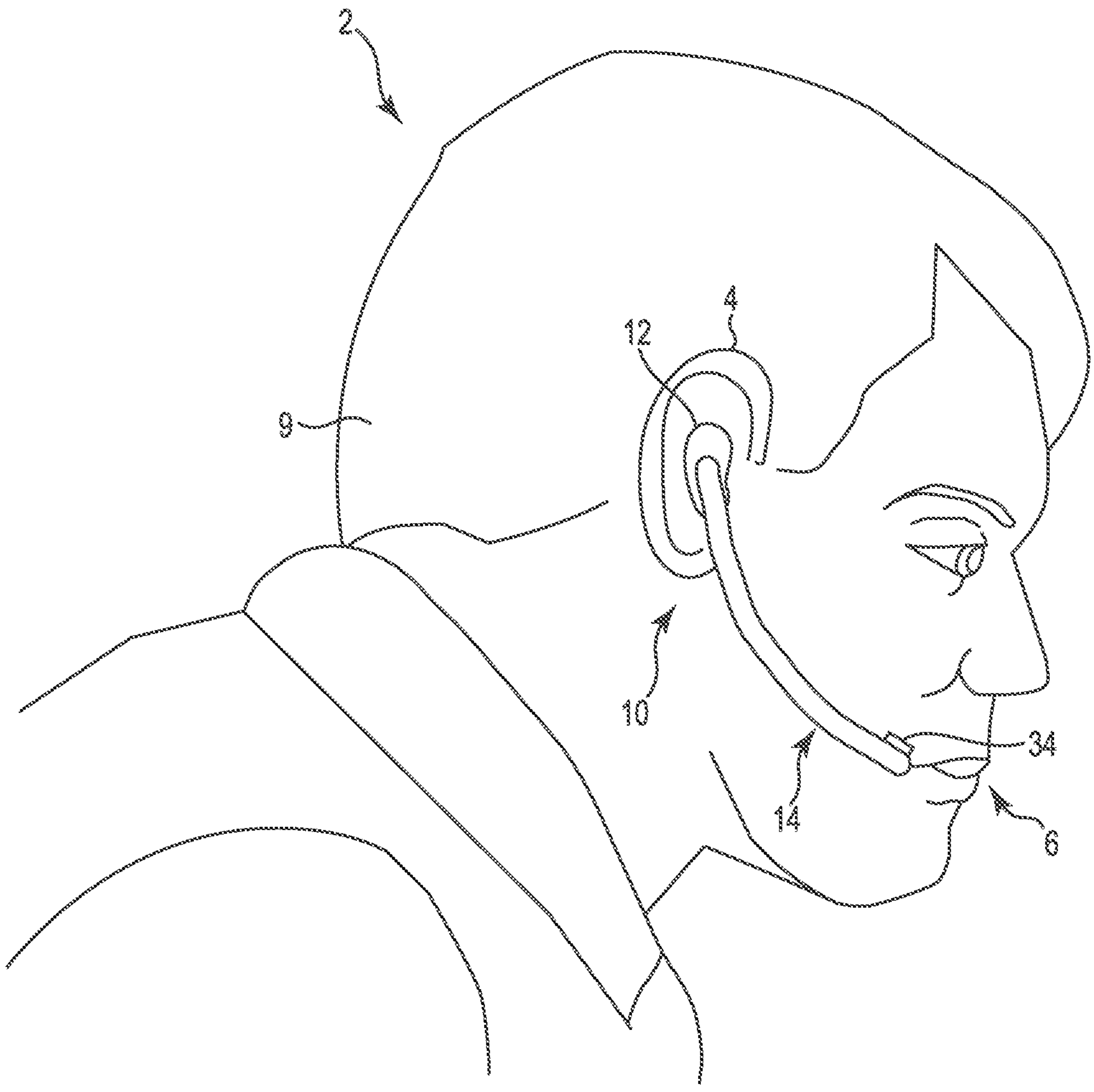
FIG. 1 is a schematic perspective view of one embodiment of a hearing device system.

In general, the present disclosure provides various embodiments of an acoustic tube and a hearing device system that includes such tube. The acoustic tube can include a magnetic coupler that is adapted to connect the acoustic tube to a housing of a hearing device of the system. The acoustic tube can also include a body and a lumen disposed within the body. An inlet can be disposed adjacent to an end of the body that is acoustically connected to the lumen. The inlet can be adapted to receive acoustic energy from a mouth of a user and direct such acoustic energy from the inlet and through the lumen and an outlet of the acoustic tube to a microphone that can be acoustically connected to the outlet.

Typical wireless hearing devices can include a boom microphone that extends from a housing of the device toward a mouth of user to receive acoustic energy from the mouth (i.e., own-voice pickup). These boom microphones, however, require complex electrical connectors and wiring and can be quite costly. Further, wireless hearing devices can include an elongated housing that attempts to place a microphone closer to the user's mouth. Such devices are not, however, discrete and can be uncomfortable for long-term use.

Further, lower-profile devices may sacrifice quality of the sound received from the user's mouth, particularly when the devices are used in noisy environments such as automobiles, restaurants, etc. As a result, improving the quality of own-voice pick-up of a discrete, low-profile hearing device can be challenging.

In addition, wireless antenna of a typical hearing device can have limited performance because of the small form factors required for the antenna to be disposed within a housing of the device and interference from being in close proximity to a head and body of a user. These antennas could benefit from being extended away from the ear and from having increased dimensions such as length. Such improvements could, however, lead to non-discreet, large, uncomfortable devices. Further, hearing devices can have limited transmission power due to small battery size and power requirements for full-day operation. This low transmission power combined with lower ear-worn device antenna performance can cause decreased transmission quality between the hearing device and a smart phone or other wirelessly connected device.

One or more embodiments of a hearing device system described herein can provide improved own-voice pickup in a more economical manner than currently existing hearing devices. In one or more embodiments, the hearing device system can include an acoustic tube that can be adapted to couple one or more microphones of the hearing device to an inlet of the acoustic tube that is disposed adjacent to the user's mouth. Because the inlet is disposed closer to the user's mouth, better own-voice pickup can be achieved. In one or more embodiments, a wind screen can be disposed over or in the inlet and that is adapted to reduce wind noise from the user's breathing or the user's surroundings.

Further, one or more embodiments of hearing device systems described herein can provide improved antenna performance for the hearing device by including an antenna disposed within the body of an acoustic tube of the system that can be electromagnetically connected or coupled to one or more wireless antennas disposed on or in the housing of the hearing device. Such antenna of the acoustic tube can improve transmission and reception of wireless signals directed to and from the hearing device.

Embodiments of the disclosure are defined in the claims. However, herein there is provided a non-exhaustive listing of non-limiting examples. Any one or more of the features of these examples may be combined with any one or more features of another example, embodiment, or aspect described herein.

Example Ex1. An acoustic tube that includes a body having a first end and a second end, a lumen disposed within the body that extends along a lumen axis between the first end and second end, and a magnetic coupler disposed adjacent to the first end of the body and adapted to connect the acoustic tube to a housing of a hearing device. The acoustic tube further includes an outlet disposed adjacent to the first end of the body and acoustically connected to the lumen, where the outlet is adapted to be acoustically connected to a microphone of the hearing device; and an inlet disposed adjacent to the second end of the body and acoustically connected to the lumen. The inlet is adapted to receive acoustic energy from a mouth of a user. The acoustic tube is adapted to direct the acoustic energy received by the inlet through the lumen and the outlet to the microphone of the hearing device.

Example Ex2. The acoustic tube of Ex1, further including a second lumen disposed within the body that extends along a second lumen axis.

Example Ex3. The acoustic tube of Ex2, where the second lumen includes a second inlet disposed adjacent to the second end of the body and a second outlet disposed adjacent to the first end of body, where the second inlet and the second outlet are acoustically connected to the second lumen.

Example Ex4. The acoustic tube of one or more of Ex1 to Ex3, where the second lumen is adapted to be acoustically connected to a second microphone disposed within the housing of the hearing device.

Example Ex5. The acoustic tube of one or more of Ex1 to Ex4, further including an antenna disposed on or within the body, where the antenna is adapted to be electrically connected to a wireless antenna of the hearing device.

Example Ex6. The acoustic tube of Ex5, where the antenna is disposed within the body and extends along the lumen axis.

Example Ex7. The acoustic tube of one or more of Ex1 to Ex6, further including a wind screen disposed adjacent to the inlet of the acoustic tube.

Example Ex8. The acoustic tube of Ex7, where the wind screen is disposed at least partially within the inlet of the acoustic tube.

Example Ex9. The acoustic tube of one or more of Ex7 to Ex8, where the wind screen comprises foam.

Example Ex10. The acoustic tube of one or more of Ex1 to Ex9, where the magnetic coupler is disposed within an end surface of the first end of the body.

Example Ex11. The acoustic tube of one or more of Ex1 to Ex10, where the magnetic coupler comprises a magnet.

Example Ex12. The acoustic tube of Ex11, where the magnetic coupler includes a second magnet, where the magnet and second magnet are adapted to orient the acoustic tube in a selected position relative to the housing of the hearing device.

Example Ex13. The acoustic tube of one or more of Ex1 to Ex12, further including a locking disposed on or within an outer surface of the body.

Example Ex15. The acoustic tube of Ex13, where the indicia include notches disposed within the outer surface of the body.

Example Ex16. The acoustic tube of Ex15, where a portion of the body is removable along a notch.

Example Ex17. The acoustic tube of one or more of Ex1 to Ex16, further including a shape memory material disposed within the body.

Example Ex18. The acoustic tube of one or more of Ex1 to Ex17, further including a gasket disposed adjacent to the first end of the body, where the gasket is adapted to acoustically seal the acoustic tube to the housing of the hearing device.

Example Ex19. The acoustic tube of one or more of Ex1 to Ex18, where the first end of the body is adapted to be disposed within a microphone port of the housing of the hearing device.

Example Ex20. A hearing device system that includes a hearing device having a housing and a microphone disposed within the housing and an acoustic tube acoustically connected to the microphone. The acoustic tube includes a body having a first end and a second end, a lumen disposed within the body that extends along a lumen axis between the first end and the second end, and a magnetic coupler disposed adjacent to the first end of the body and adapted to connect the acoustic tube to the housing of the hearing device. The acoustic tube further includes an outlet disposed adjacent to the first end of the body and acoustically connected to the lumen, where the acoustic tube is acoustically connected to the microphone through the outlet; and an inlet disposed adjacent to the second end of the body and acoustically connected to the lumen. The inlet is adapted to receive acoustic energy from a mouth of a user. Further, the acoustic tube is adapted to direct the acoustic energy received by the inlet through the lumen and the outlet to the microphone of the hearing device.

Example Ex21. The system of Ex20, where the hearing device is adapted to be disposed at least partially within an ear canal of the user.

Example Ex22. The system of Ex20, where the hearing device is adapted to be disposed at least partially behind an ear of the user.

Example Ex23. The system of Ex20, where the hearing device is adapted to be at least partially disposed in an ear of the user.

Example Ex24. The system of one or more of Ex20 to Ex23, where the housing further includes a port, and where the first end of the acoustic tube is adapted to be disposed within the port.

Example Ex25. The system of one or more of Ex20 to Ex24, where the hearing device further includes a magnet that is adapted to magnetically connect the housing to the magnetic coupler of the acoustic tube.

Example Ex26. The system of Ex25, where the magnet of the hearing device includes a recharging magnet that is further adapted to magnetically connect the hearing device to a charging base.

Example Ex27. The system of one or more of Ex20 to Ex26, further including a gasket disposed either in the housing of the hearing device or adjacent to the first end of the acoustic tube, where the gasket is adapted to acoustically seal the acoustic tube to the housing.

Example Ex28. The system of one or more of Ex20 to Ex27, further including a second acoustic tube that is adapted to be acoustically connected to the hearing device, where the second acoustic tube includes a body including a first end and a second end, a lumen disposed within the body that extends along a lumen axis between the first end and second end, and a magnetic coupler disposed adjacent to the first end of the body and adapted to connect the second acoustic tube to the housing of the hearing device. The acoustic tube further includes an outlet disposed adjacent to the first end of the body and acoustically connected to the lumen, where the second acoustic tube is acoustically connected to the microphone; and an inlet disposed adjacent to the second end of the body and acoustically connected to the lumen, where the inlet is adapted to receive acoustic energy from the mouth of a user. The second acoustic tube is adapted to direct the acoustic energy received by the inlet through the lumen and the outlet to a second microphone of the hearing device.

Example Ex29. The system of Ex28, where the inlet of the acoustic tube is disposed at a selected distance from the inlet of the second acoustic tube as measured in a direction parallel to the lumen axis of the acoustic tube.

Example, Ex30. The system of one or more of Ex28 to Ex29, where the second acoustic tube is connected to the acoustic tube.

Example Ex31. The system of one or more of Ex28 to Ex30, where the first end of the second acoustic tube is adapted to be disposed within a second port of the housing of the hearing device.

Example Ex32. The system of one or more of Ex20 to Ex31, further including a second lumen disposed within the body of the acoustic tube that extends between the first end and the second end of the body, where the second lumen is acoustically connected to the inlet and the outlet.

Example Ex33. The system of Ex32, further including a second inlet disposed adjacent to the second end of the body and a second outlet disposed adjacent to the first end of body, where the second inlet and the second outlet are acoustically connected to the second lumen.

Example Ex34. The system of one or more Ex32 to Ex33, where the second lumen is adapted to be acoustically connected to a second microphone disposed within the housing of the hearing device.

Example Ex35. The system of one or more of Ex20 to Ex34, further including an antenna disposed on or within the body of the acoustic tube, where the antenna is adapted to be electromagnetically connected to a wireless transceiver of the hearing device.

Example Ex36. The system of Ex35, where the antenna is disposed within the body of the acoustic tube and extends along the lumen axis.

Example Ex37. The system of one or more of Ex20 to Ex36, further including a wind screen disposed adjacent to the inlet of the lumen of the acoustic tube.

Example Ex38. The system of Ex37, where the wind screen is disposed within the inlet of the lumen.

Example Ex39. The system of one or more of Ex37 to Ex38, where the wind screen comprises foam.

Example Ex40. The system of one or more of Ex20 to Ex39, where the magnetic coupler of the acoustic tube is disposed within an end surface of the first end of the body.

Example Ex41. The system of one or more of Ex20 to Ex40, where the magnetic coupler comprises a magnet.

Example Ex42. The system of Ex41, where the magnetic coupler includes a second magnet, where the magnet and second magnet are adapted to orient the acoustic tube in a selected position relative to the housing of the hearing device.

Example Ex43. The system of one or more of Ex20 to Ex42, further including a locking mechanism disposed adjacent to the first end of the body of the acoustic tube, where the locking mechanism is adapted to engage a locking mechanism of the housing of the hearing device to removably connect the acoustic tube to the housing of the hearing device.

Example Ex44. The system of one or more of Ex20 to Ex43, further including indicia disposed on or within an outer surface of the body of the acoustic tube.

Example Ex45. The system of Ex44, where the indicia include notches disposed within the outer surface of the body.

Example Ex46. The system of Ex45, where a portion of the body is removable along a notch.

Example Ex47. The system of one or more of Ex20 to Ex46, further including a shape memory material disposed within the body.

Example Ex48. The system of one or more of Ex20 to Ex47, where the first end of the body of the acoustic tube is adapted to be disposed within a microphone port of the housing of the hearing device.

Example Ex49. A method that includes magnetically connecting an acoustic tube to a housing of a hearing device such that an outlet of the acoustic tube is acoustically connected to a microphone disposed within the housing, positioning an inlet of the acoustic tube adjacent to a mouth of a user, and directing acoustic energy from the mouth of the user from the inlet of the acoustic tube to the microphone through the outlet of the acoustic tube.

Example Ex50. The method of Ex49, further including connecting a second acoustic tube to the housing of the hearing device such that an outlet of the second acoustic tube is acoustically connected to a second microphone disposed within the housing, positioning an inlet of the second acoustic tube adjacent to the mouth of the user at a selected distance from the inlet of the acoustic tube as measured in a direction along a lumen axis of a lumen of the acoustic tube, and determining a time delay between an acoustic signal transmitted from a mouth of a user to the microphone by the acoustic tube and a second acoustic signal transmitted from the mouth of the user to the second microphone by the second acoustic tube.

Example Ex51. The method of one or more of Ex49 to Ex50, further including removing a portion of the acoustic tube adjacent to the second end of the tube such that the inlet of the tube is disposed at a selected distance from the mouth of the user.

FIGS. 1-5 are various schematic views of one embodiment of a hearing device system 10 as worn by a user 2. The system 10 includes a hearing device 12 having a housing 28 and a microphone 32 disposed within the housing, and an acoustic tube 14 acoustically connected to the microphone. The acoustic tube 14 includes a body 16 having a first end 18 and a second end 20, a lumen 22 disposed within the body that extends along a lumen axis 24 between the first end and the second end, and a magnetic coupler 26 disposed adjacent to the first end of the body and adapted to connect the acoustic tube to the housing of the hearing device. The acoustic tube 14 further includes an outlet 30 disposed adjacent to the first end 18 of the body 16 and acoustically connected to the lumen 22, where the acoustic tube is acoustically connected to the microphone 32 through the outlet; and an inlet 34 disposed adjacent to the second end 20 of the body and acoustically connected to the lumen, where the inlet is adapted to receive acoustic energy from a mouth 6 of the user 2. The acoustic tube 14 is adapted to direct the acoustic energy received by the inlet 34 through the lumen 22 and the outlet 30 to the microphone 32 of the hearing device 12.

The system 10 can include any suitable hearing device or devices 12, e.g., over-the-ear or in-ear headphones, an earpiece, etc. In one or more embodiments, the hearing device 12 can include a hearing assistance device such as behind-the-ear (BTE), in-the-ear (ITE), in-the-canal (ITC), or completely-in-the-canal (CIC) type hearing devices. It is understood that behind-the-ear type hearing devices can reside substantially behind the ear or over the ear. Such devices can include receivers associated with an electronics portion of the behind-the-ear device, or receivers disposed in the ear canal of the wearer. Such devices are also known as receiver-in-the-canal (MC) or receiver-in-the-ear (RITE) hearing devices. In one or more embodiments, the hearing device 12 can include a cochlear implant (including its processor) or a bone-conduction or otherwise osseointegrated hearing device. In one or more embodiments, the hearing device 12 is adapted to be disposed at least partially within an ear canal of an ear 4 of the user 2. In one or more embodiments, the hearing device 12 is adapted to be disposed behind the ear 4 of the user 2. In one or more embodiments, the hearing device 12 is adapted to be at least partially disposed in the ear 4 of the user 2.

While depicted as including one hearing device 12, the system 10 can include two or more hearing devices. For example, in one or more embodiments, the system 10 can include a left hearing device that is adapted to be acoustically connected to the wearer's left ear and a right hearing device that is adapted to be acoustically connected to the wearer's right ear. In one or more embodiments, the left hearing device can electromagnetically communicate with the right hearing device using any suitable technique or techniques.

The housing 28 of the hearing device 12 can take any suitable shape or shapes and have any suitable dimensions depending upon where the hearing device is intended to be disposed. For example, for BTE hearing devices, the housing 28 is shaped such that it can be disposed behind the ear 4 of the user between the ear and a skull 9 of the user 2. Further, for example, for MC hearing devices, the housing 28 is shaped such that at least a portion of the housing can be disposed within an ear canal (not shown) of the user 2. Further, the housing 28 can include any suitable material or materials, e.g., at least one of a metallic, polymeric, or inorganic material.

Disposed within the housing 28 of the hearing device 12 are electronic components 36 (FIG. 5), which include the microphone 32. The electronic components 36 can include any suitable device or devices, e.g., integrated circuits, power sources, microphones, receivers, etc. For example, in one or more embodiments, the components 36 can include a controller 38, the microphone 32, a receiver 52 (i.e., speaker), a power source 54, an antenna 46, and a sensor 56. The microphone 32, receiver 52, power source 54, antenna 46, and sensor 56 can be electrically connected to the controller 38 using any suitable technique or techniques.

Any suitable controller 38 can be utilized with the hearing device 12. For example, in embodiments where the hearing device 12 is utilized as a hearing aid, the controller 38 can be adapted to employ programmable gains to adjust the hearing device output to the wearer's hearing impairment. The controller 38 can be a digital signal processor (DSP), microprocessor, microcontroller, other digital logic, or combinations thereof. The processing can be done by a single processor or can be distributed over different devices. The processing of signals referenced in this disclosure can be performed using the controller 38 or over different devices.

Processing may be done in the digital domain, the analog domain, or combinations thereof. Processing may be done using subband processing techniques. Processing may be done using frequency domain or time domain approaches. Some processing may involve both frequency and time domain aspects. For brevity, in some examples, drawings may omit certain blocks that perform frequency synthesis, frequency analysis, analog-to-digital conversion, digital-to-analog conversion, amplification, buffering, and certain types of filtering and processing. In one or more embodiments, the controller 38 or other processing devices execute instructions to perform signal processing tasks. Such embodiments can include analog components in communication with the controller 38 to perform signal processing tasks, such as sound reception by the microphone 32, or playing of sound using the receiver 52.

The electronic components 36 can also include the microphone 32 that is electrically connected to the controller 38. Although one microphone 32 is depicted, the components 36 can include any suitable number of microphones (e.g., two microphones as shown in the embodiment illustrated in FIG. 11). Further, the microphone 32 can be disposed in any suitable location within the housing 28. For example, in one or more embodiments, a microphone port or opening 42 can be formed in the housing 28, and the microphone 32 can be disposed adjacent to the port to receive audio information from at least one of the user's environment or the acoustic tube 14.

Any suitable microphone 32 can be utilized, e.g., an acoustic transducer, including, but not limited to, acoustic receivers that may be of the balanced armature type, MEMS microphones, electret microphones, and dynamic microphones. In one or more embodiments, the microphone 32 can be selected to detect one or more audio signals and convert such signals to an electrical signal that is provided to the controller 38. Although not shown, the controller 38 can include an analog-to-digital convertor that converts the electrical signal from the microphone 32 to a digital signal.

The electronic components 36 can also include the antenna 46. Any suitable antenna or combination of antennas can be utilized. In one or more embodiments, the antenna 46 can include one or more antennas having any suitable configuration. Further, for example, antenna configurations can vary and can be included within the housing 28 or be external to the housing. The antenna 46 can be compatible with any suitable protocol or combination of protocols. In one or more embodiments, the components 36 can also include a transmitter that transmits electromagnetic signals and a radio-frequency receiver that receives electromagnetic signals using any suitable protocol or combination of protocols.

For example, in one or more embodiments, the hearing device 12 can be connected to one or more external devices using, e.g., Bluetooth, Wi-Fi, magnetic induction, etc. For example, in one or more embodiments, the hearing device 12 can be wirelessly connected to the Internet using any suitable technique or techniques. Such connection can enable the hearing device 12 to access any suitable databases, including medical records databases, cloud computing databases, location services, etc. In one or more embodiments, the hearing device 12 can be wirelessly connected utilizing the Internet of Things (IoT) such that the hearing device can communicate with, e.g., hazard beacons, one or more cameras disposed in proximity to the wearer, motion sensors, room lights, etc.

In embodiments where the hearing device system 10 includes a second hearing device disposed on an opposite side of the wearer's head, the antenna 46 can be utilized to communicate with an antenna of the second hearing device. In one or more embodiments, a low-power link across the wearer's head can be utilized to transmit electromagnetic signals between the first and second hearing devices.

The hearing device 12 can include any suitable receiver or receivers. Further, the hearing device 12 can include any suitable power source, e.g., a rechargeable or primary/non-rechargeable battery, including but not limited to Li-Ion rechargeable, Zn-Air non-rechargeable, AgZn rechargeable, or NiMH rechargeable batteries. In addition, the hearing device 12 can include any suitable sensor or sensors, e.g., accelerometer or other inertial measurement unit, heart-rate sensor, $SpO_2$ sensor, blood pressure sensor, temperature sensor, a magnetic sensor including a giant magnetoresistance sensor or tunnel magneto-resistive sensor, and a telecoil.

The system 10 can include any suitable acoustic tube 14. The acoustic tube 14 can include the body 16 that includes the first end 18 and the second end 20, the lumen 22 disposed within the body that extends along the lumen axis 24 between the first end and second end, and the magnetic coupler 26 disposed adjacent to the first end of the body and adapted to connect the acoustic tube to the housing 28 (FIG. 5) of the hearing device 12. The acoustic tube 14 also includes the outlet 30 disposed adjacent to the first end 18 of the body 16 and acoustically connected to the lumen 22. As used herein, the phrase "adjacent to the first end" means that an element or component is disposed closer to the first end 18 of the body 16 of the acoustic tube 14 than to the second end 20 of the body. The outlet 30 is adapted to be acoustically connected to the microphone 32 (FIG. 5) of the hearing device 12. The acoustic tube 14 also includes the inlet 34 (FIG. 3) disposed adjacent to the second end 20 of the body 16 and acoustically connected to the lumen 22, where the inlet is adapted to receive acoustic energy from the mouth 6 of the user 2. As used herein, the term "adjacent to the second end" means that an element or component is disposed closer to the second end 20 of the body 16 of the acoustic tube 14 than to the first end 18. The acoustic tube 14 is adapted to direct the acoustic energy received by the inlet 34 through the lumen 22 and the outlet 30 to the microphone 32 of the hearing device 12.

The acoustic tube 14 can include any suitable material or materials, e.g., metallic, polymeric, or inorganic materials. In one or more embodiments, the acoustic tube 14 can include any suitable polymeric material, e.g., silicone rubber, thermoset plastic or thermoplastic material, epoxy, PVC, metal, or other suitable material or combination of materials.

Figure 2:
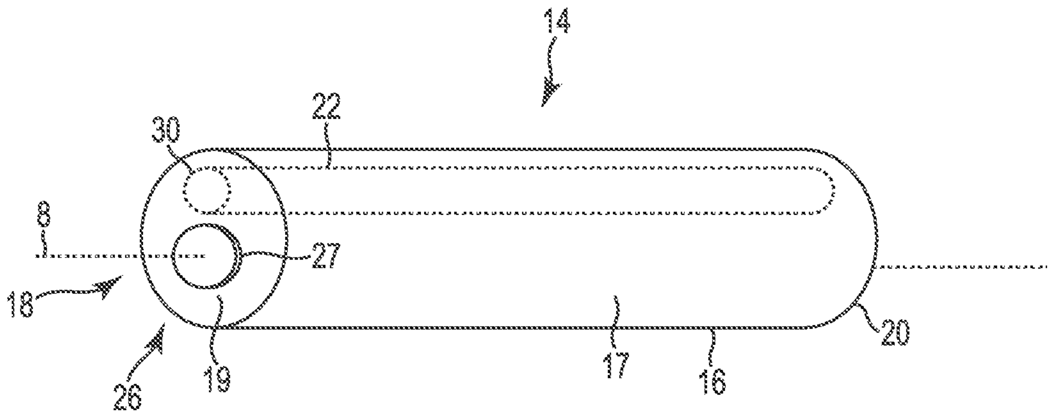
FIG. 2 is a schematic perspective view of an acoustic tube of the hearing device system of FIG. 1.

Further, the acoustic tube 14 can take any suitable shape or shapes and have any suitable dimensions. For example, the acoustic tube 14 can have any suitable length as measured between the first end 18 and the second end 20 of the body 16 along a body axis 8 (FIG. 2). The acoustic tube 14 can take a curved shape in a plane parallel to the body axis 8 and a side of the user's face, i.e., the plane of FIG. 1. In one or more embodiments, the acoustic tube 14 can take a curved shape in a plane perpendicular to the user's face, i.e., perpendicular to the plane of FIG. 1. Further, in one or more embodiments, the acoustic tube 14 can take a curved shape in each of these planes. The acoustic tube 14 can include a unitary body 16. In one or more embodiments, the acoustic tube 14 can include two or more portions that are connected together using any suitable technique or techniques to form the body 16.

Disposed within the body 16 of the acoustic tube 14 is the lumen 22. The lumen 22 extends along the lumen axis 24 between the first end 18 and the second end 20 of the body 16. The lumen 22 can take any suitable shape or shapes and have any suitable dimensions. For example, the lumen 22 can have any suitable cross-sectional shape or area as measured in a plane perpendicular to the lumen axis 24. In one or more embodiments, the lumen 22 has a circular cross-sectional shape in the plane perpendicular to the lumen axis 24. In one or more embodiments, the lumen 22 has a constant cross-sectional area along the lumen axis 24. In one or more embodiments, the lumen 22 can have a cross-sectional area in such plane that varies along the lumen axis 24.

Disposed adjacent to the first end 18 of the body 16 of the acoustic tube 14 is the magnetic coupler 26, which is adapted to removably connect the acoustic tube to the housing 28 of the hearing device 12. The magnetic coupler 26 can take any suitable shape or shapes and have any suitable dimensions. Further, the magnetic coupler 26 can be disposed in any suitable location on or within the first end 18 of the body 16 of the acoustic tube 14. Although depicted in FIG. 2 as being disposed on an end surface 19 of the first end 18 of the body 16, the magnetic coupler 26 can be disposed at least partially within the end surface or completely within the end surface using any suitable techniques. Further, the magnetic coupler 26 can be connected to the body 16 of the acoustic tube 14 using any suitable technique or techniques, e.g., mechanical fastening, adhering, bonding, molding, gluing, velcroing, press-fitting, etc. In one or more embodiments, the magnetic coupler can be molded into the first end 18 of the body 16 of the acoustic tube.

The magnetic coupler 26 can include any suitable magnetic element or device. In one or more embodiments, the magnetic coupler 26 includes a magnet or magnets 27. Any suitable magnet can be utilized for the magnetic coupler 26, neodymium or other rare-earth type magnet. Further, the magnet 27 can take any suitable shape or shapes. In one or more embodiments, the magnetic coupler 26 can include a second magnet, where the magnet 27 and the second magnet are adapted to orient the acoustic tube 14 in a selected position relative to the housing 28 of the hearing device 12.

Figure 5:
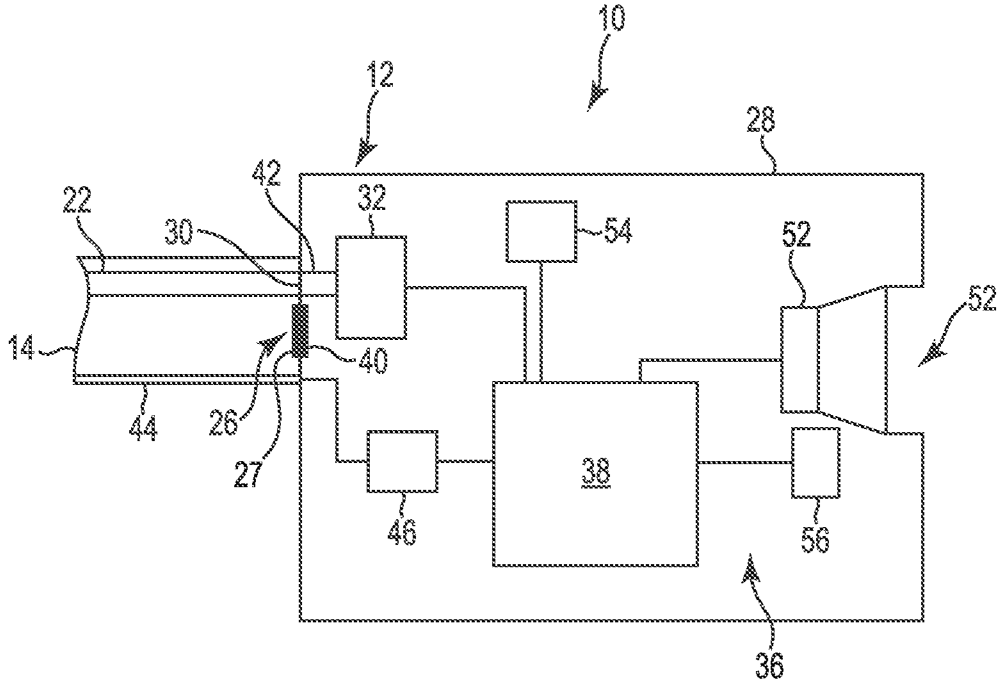
FIG. 5 is a schematic plan view of the hearing device system of FIG. 1.
Figure 6:
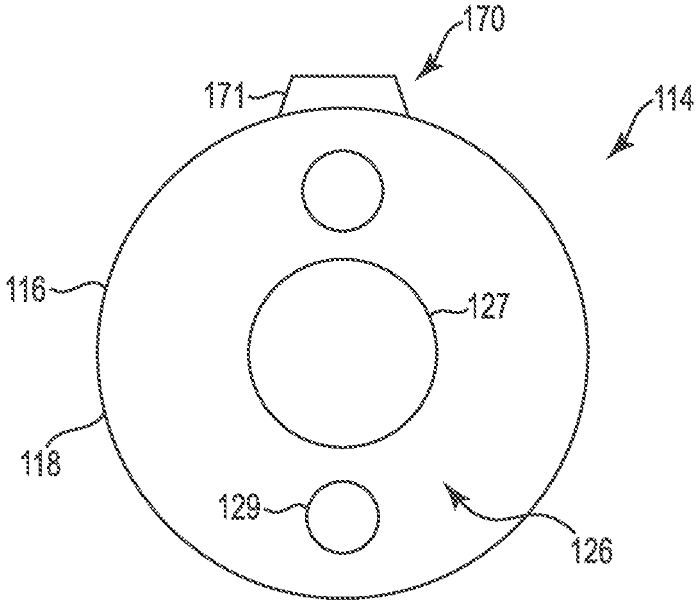
FIG. 6 is a schematic plan view of another embodiment of an acoustic tube.
Figure 7:
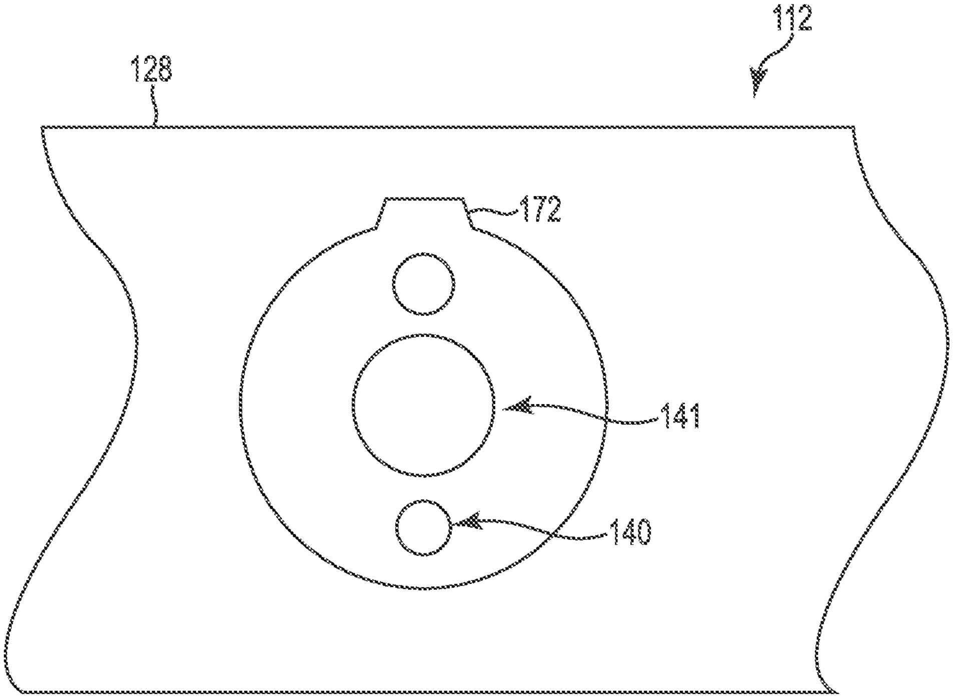
FIG. 7 is a schematic plan view of a portion of a housing of another embodiment of a hearing device that is adapted to be connected to the acoustic tube of FIG. 6.

For example, FIG. 6 is a schematic plan view of another embodiment of an acoustic tube 114. All of the design considerations and possibilities described herein regarding the acoustic tube 14 of FIGS. 1-5 apply equally to the acoustic tube 114 of FIG. 6. As shown in FIG. 6, the acoustic tube 114 includes a magnetic coupler 126 that includes a first magnet 127 and a second magnet 129. The first and second magnets 127, 129 can be utilized to orient the acoustic tube 114 in a selected position relative to a housing of a hearing device using any suitable technique or techniques. For example, FIG. 7 is a schematic plan view of a portion of a housing 128 of a hearing device 112. All of the design considerations and possibilities regarding the hearing device 12 of FIGS. 1-5 apply equally to the hearing device 112 of FIG. 7. One or more magnets 140, 141 can be disposed on or within the housing 128 of the hearing device 112 and positioned such that they form one or more detent positions with the first and second magnets 127, 129 of the magnetic coupler 126 of the acoustic tube 114. Such detent positions can orient the acoustic tube 114 in a desired position relative to the housing 128. For example, the magnet 140 disposed on or within the housing 128 can have a north polarity while the first and second magnets 127, 129 of the magnetic coupler 126 of the acoustic tube 114 can each have north polarities such that they repel the north-polarity magnet of the housing into a detent position that can be defined such that the magnet 140 of the hearing device 112 is disposed between the first and second magnets 127, 129 of the magnetic coupler 126.

Returning to FIGS. 1-5, magnetic coupler 26 can be adapted to connect the acoustic tube 14 to the housing 28 of the hearing device 12 using any suitable technique or techniques. For example, as shown in FIG. 5, the magnetic coupler 26 can magnetically connect to magnet 40 disposed on or within the housing 28 of the hearing device 12. For example, the magnet 27 of the magnetic coupler 26 can have a north polarity, and the magnet 40 of the housing 28 can have a south polarity such that the magnetic coupler is magnetically attracted to the magnet of the hearing device 12. The magnet 40 disposed on or within the housing 28 can include any suitable magnet. Although depicted as a single magnet, the magnet 40 of the hearing device 12 can include any suitable number of magnets. Further, the magnet 40 can include any suitable type of magnet, e.g., the same type of magnets described herein regarding magnet 27 of the magnetic coupler 26. In one or more embodiments, the magnet 40 is a recharging magnet that is further adapted to magnetically connect the hearing device 12 to a charging base. Further, in one or more embodiments, the magnet 40 can be used to attach, or provide DC power for, other devices that attach to the outside of the hearing device 12 such as a magnetically-attached piece of foam that covers the hearing device microphone for reducing wind-generated-noise, and one or more sensors that are external to the housing 28.

The acoustic tube 14 further includes the outlet 30 disposed adjacent to the first end 18 of the body 16. The outlet 30 is acoustically connected to the lumen 22. In one or more embodiments, the outlet 30 is open to the lumen 22 such that the outlet and the lumen form a continuous, open path. Further, the outlet 30 is adapted to be acoustically connected to the microphone 32 of the hearing device 12 using any suitable technique or techniques. For example, as shown in FIG. 5, the outlet 30 of the acoustic tube 14 is acoustically connected to the microphone 32 of the hearing device 12 via microphone port 42. As used herein, the term "acoustically connected" means that acoustic energy can be directed from one element to another element. For example, acoustic energy disposed within the lumen 22 of the acoustic tube 14 can be directed through the outlet 30 of the tube and the microphone port 42 to the microphone 32.

Disposed adjacent to the second end 20 of the body 16 of the acoustic tube 14 is the inlet 34. The inlet 34 can take any suitable shape or shapes and have any suitable dimensions. Further, the inlet 34 is acoustically connected to the lumen 22 using any suitable technique or techniques. The inlet 34 is adapted to receive acoustic energy from the mouth 6 of the user 2 using any suitable technique or techniques. In one or more embodiments, the inlet 34 is an opening that is continuous with the lumen 22 to provide an open path for the acoustic energy from the mouth 6 of the user 2.

Further, in one or more embodiments, the acoustic tube 14 can include a wind screen 48 disposed adjacent to the inlet 34 of the acoustic tube. As used herein, the term "adjacent to the inlet" means an element or component is disposed closer to the inlet 34 of the acoustic tube 14 than to the outlet 30. In one or more embodiments, the wind screen 48 is disposed over the inlet 34 such that the wind screen occludes the inlet. In one or more embodiments, the wind screen 48 is disposed at least partially within the inlet 34 of the acoustic tube 14. Further, in one or more embodiments, the wind screen 48 can be disposed entirely within the inlet 34. Any suitable wind screen can be utilized. Further, the wind screen 48 can include any suitable material or materials, e.g., open-cell foam that is adapted to pass acoustic energy without generating undo wind noise from passing air flow. In one or more embodiments, the wind screen 48 can include any suitable foam disposed adjacent to the inlet 34 using any suitable technique or techniques. At least one of the wind screen 48 or the acoustic tube 14 can further include a connector that is adapted to removably connect the wind screen to the acoustic tube 14.

Figure 8:
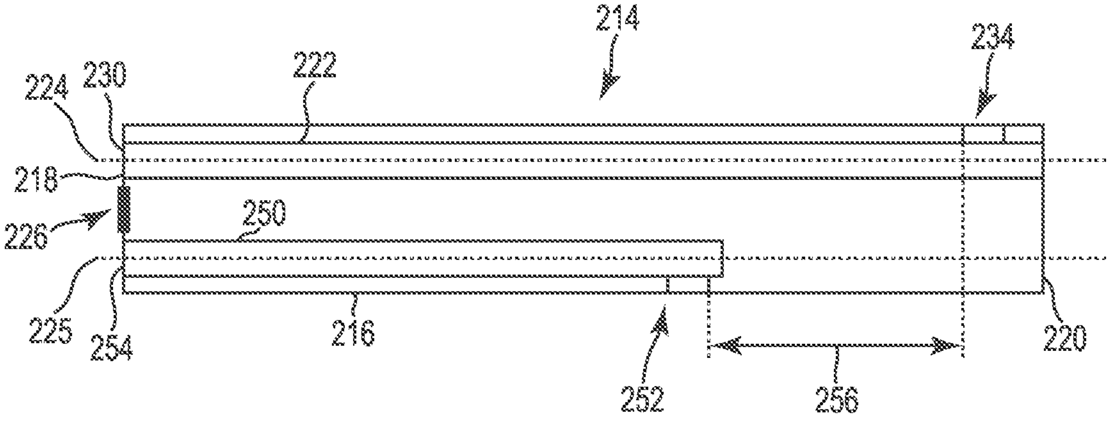
FIG. 8 is a schematic cross-section view of another embodiment of an acoustic tube.

The acoustic tube 14 can include any suitable number of lumens. For example, FIG. 8 is a schematic cross-section view of another embodiment of an acoustic tube 214. All of the design considerations and possibilities described herein regarding the acoustic tube 14 of FIGS. 1-5 apply equally to the acoustic tube 214 of FIG. 8. The acoustic tube 214 includes a lumen 222 disposed within a body 216 of the acoustic tube and extending along a lumen axis 224 between a first end 218 and a second end 220 of the body. The acoustic tube 214 also includes an outlet 230 disposed adjacent to the first end 218 of the body 216 and acoustically connected to the lumen 222, and an inlet 234 disposed adjacent to the second end 220 of the body and acoustically connected to the lumen.

The acoustic tube 214 also includes a second lumen 250 disposed within the body 216 that extends between the first end 218 and the second end 220 of the body along a second lumen axis 225. The acoustic tube 214 includes a second outlet 254 disposed adjacent to the first end 218 of the body 216 and acoustically connected to the second lumen 250, and a second inlet 252 disposed adjacent to the second end 220 of the body and acoustically connected to the second lumen. The lumen axis 224 and the second lumen axis 225 can form any suitable angle. In one or more embodiments, the lumen axis 224 is substantially parallel to the second lumen axis 225. As used herein, the term "substantially parallel" means that two lines or planes form an angle that is no greater than 8 degrees.

The second lumen 250 can have any suitable length along the second lumen axis 225. In one or more embodiments, the second lumen 250 has a length that is less than a length of the lumen 222 as measured along the lumen axis 224. Further, the second lumen 250 can take any suitable shape or shapes and have any suitable cross-sectional shape in a plane perpendicular to the second lumen axis 225. In one or more embodiments, the lumen 222 and the second lumen 250 have the same cross-sectional shape and area.

Figure 9:
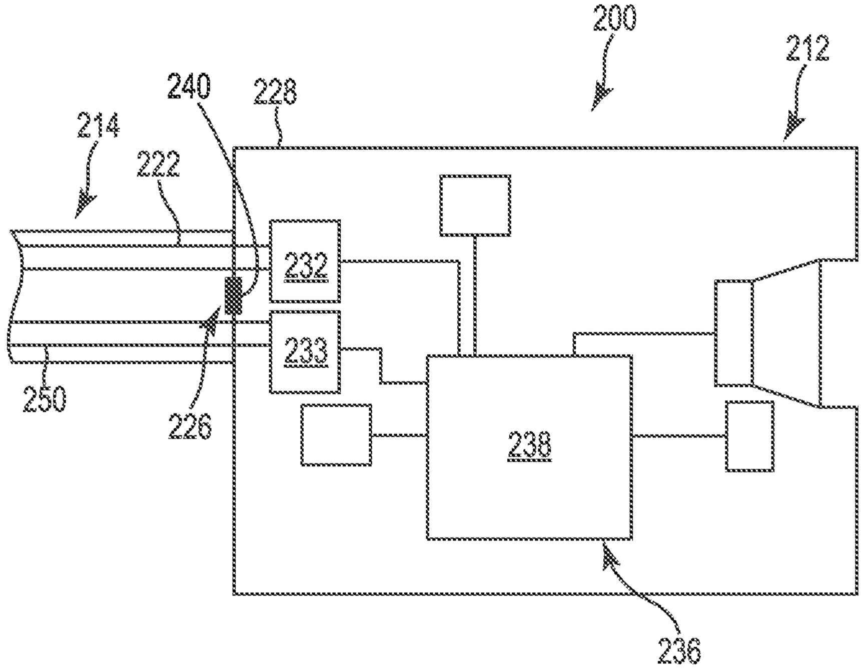
FIG. 9 is a schematic plan view of another embodiment of a hearing device system that includes the acoustic tube of FIG. 8.

FIG. 9 is a schematic plan view of another embodiment of a hearing device system 200. All of the design considerations and possibilities described herein regarding the hearing device system 10 of FIGS. 1-5 apply equally to the hearing device system 200 of FIG. 9. As shown in FIG. 9, the hearing device system 200 includes a hearing device 212 and the acoustic tube 214 of FIG. 8. The acoustic tube 214 is connected to housing 228 of the hearing device 212 such that the lumen 222 is acoustically connected to microphone 232 of electronic components 236 of the hearing device, and the second lumen 250 is acoustically connected to second microphone 233 of the electronic components. Each of the microphones 232, 233 are electrically connected to controller 238 of the electronic components 236. The acoustic tube 214 can be connected to the hearing device 212 using any suitable technique or techniques, e.g., the same techniques described herein regarding hearing device system 10 of FIGS. 1-5. In one or more embodiments, the acoustic tube 214 is connected to the hearing device 212 by magnetic coupler 226 of the acoustic tube 214 and magnet 240 disposed on or within the housing 228 of the hearing device 212.

In one or more embodiments, the inlet 234 of the lumen 222 is spaced any suitable distance 256 from the inlet 252 of the second lumen 250 as measured in a direction parallel to the lumen axis 224, e.g., no greater than 12 mm. The use of two inlets 234, 252 spaced apart along the lumen axis 224 can provide various processing advantages. For example, controller 238 can be adapted to receive an electrical signal from the first microphone 232 that is representative of acoustic energy received by the inlet 234 and directed through the lumen 222 and the outlet 230 to the microphone.

The controller 238 is further adapted to receive a second electrical signal from the second microphone 233 that is representative of acoustic energy received by the second inlet 252 and directed through the second lumen 250 and the second outlet 254 to the second microphone 233. By applying a phase shift and combination of the acoustic energy from the inlets 234, 252, an acoustic directional pattern can be provided towards the user's mouth, e.g., a cardioid pattern with a 90-degree phase shift.

Returning to FIGS. 1-5, the acoustic tube 14 can also include an antenna 44 disposed on or within the body 16 of the acoustic tube as shown in FIG. 3. The antenna 44 can include any suitable antenna or antennas. Further, the antenna 44 can have any suitable dimensions and take any suitable shape or shapes. In one or more embodiments, the antenna 44 is disposed within the body 16 and extends in a direction parallel to the lumen axis 24. In one or more embodiments, the antenna 44 is disposed on an outer surface 17 of the lumen body 16 and can extend any suitable length in a direction parallel to the lumen axis 24. In one or more embodiments, the antenna 44 can be adapted to be electrically connected to the wireless antenna 46 of the electronic components 36 as shown in FIG. 5 using any suitable technique or techniques.

Figure 13:
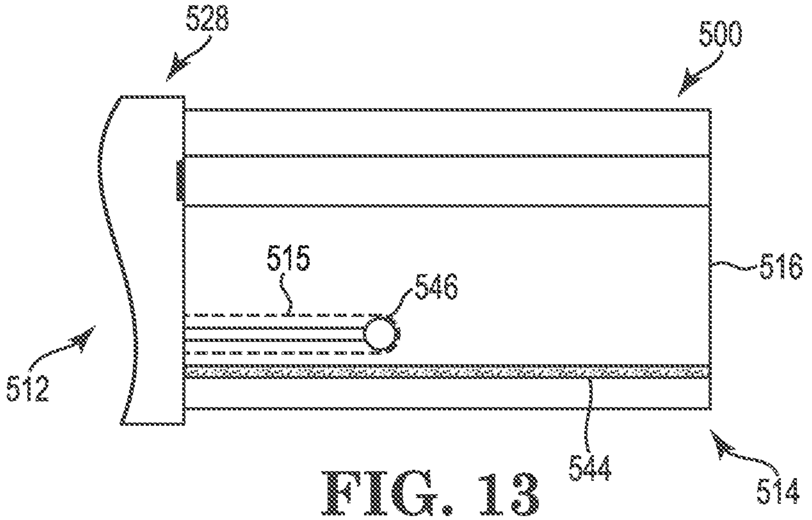
FIG. 13 is a schematic plan view of another embodiment of a hearing device system.

Any suitable configuration of antenna of the acoustic tube and wireless antenna of the hearing device can be utilized with the various embodiments of hearing device systems described herein. For example, FIG. 13 is a schematic cross-section view of a portion of another embodiment of a hearing device system 500. All of the design considerations and possibilities described herein regarding the hearing device system 10 of FIGS. 1-5 apply equally to the hearing device system 500 of FIG. 13. An acoustic tube 514 is acoustically connected to a microphone (not shown) disposed within a housing 528 of hearing device 512. The acoustic tube 514 includes an antenna 544 disposed on or within a body 516 of the acoustic tube. The antenna 544 is adapted to be electromagnetically connected to antenna 546 of the hearing device 512. The antenna 546 can be any suitable antenna, e.g., a pull cord antenna. The acoustic tube 514 can include a channel or void 515 that is adapted to receive the antenna 546 of the hearing device 512 such that the antenna is disposed within the acoustic tube when the acoustic tube is connected to the housing 528. The antenna 544 of the acoustic tube 514 can be electromagnetically connected to the antenna 546 of the hearing device 510 using any suitable technique or techniques, e.g., electromagnetic coupling.

Figure 14:
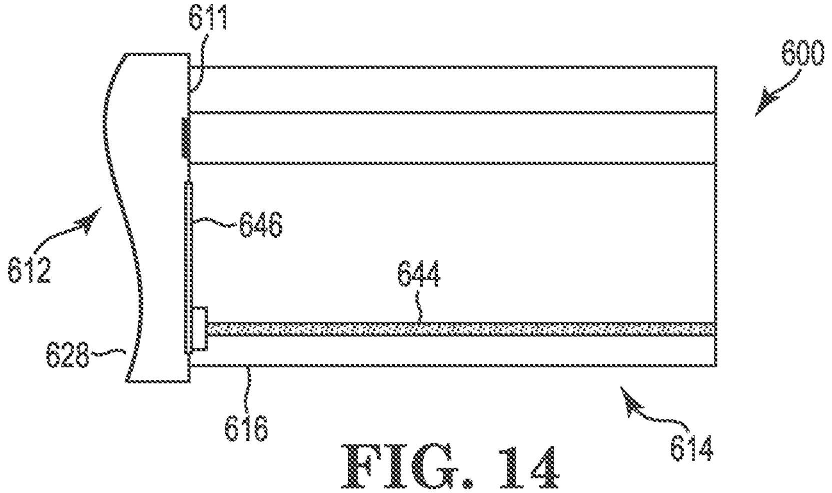
FIG. 14 is a schematic plan view of another embodiment of a hearing device system.

Further, for example, FIG. 14 is a schematic cross-section view of another embodiment of a hearing device system 600. All of the design considerations and possibilities described herein regarding the hearing device system 10 of FIGS. 1-5 apply equally to the hearing device system 600 of FIG. 14. Acoustic tube 614 includes an antenna 644 disposed on or within a body 616 of the tube. Such antenna 644 is electromagnetically connected to antenna 646 of hearing device 612. The antenna 646 of the hearing device 610 is disposed on an end face 611 of housing 628 of the hearing device 610. The antenna 644 of the acoustic tube 614 can be electromagnetically connected to the antenna 646 of the hearing device 610 using any suitable technique or techniques. In one or more embodiments, the antenna 644 of the acoustic tube 614 is in contact with the antenna 646 of the hearing device 610 such that an electrical connection is formed between the two antennas. In one or more embodiments, the antenna 644 of the acoustic tube 614 is spaced apart from the antenna 646 of the hearing device 610 such that the two antennas are capacitively or electromagnetically connected. The antenna 646 of the hearing device 612 can include any suitable antenna or antennas disposed in or on any suitable portion or portions of end face 611. Further, the antenna 646 can take any suitable shape or shapes. In one or more embodiments, the hearing device 610 can further include a pull cord antenna (e.g., antenna 546 of FIG. 13) that can be disposed into a channel or void disposed in the acoustic tube proximate to the antenna 646 of the hearing device such that the pull cord antenna is also electromagnetically connected to the antenna 644 of the acoustic tube 614.

Figure 15:
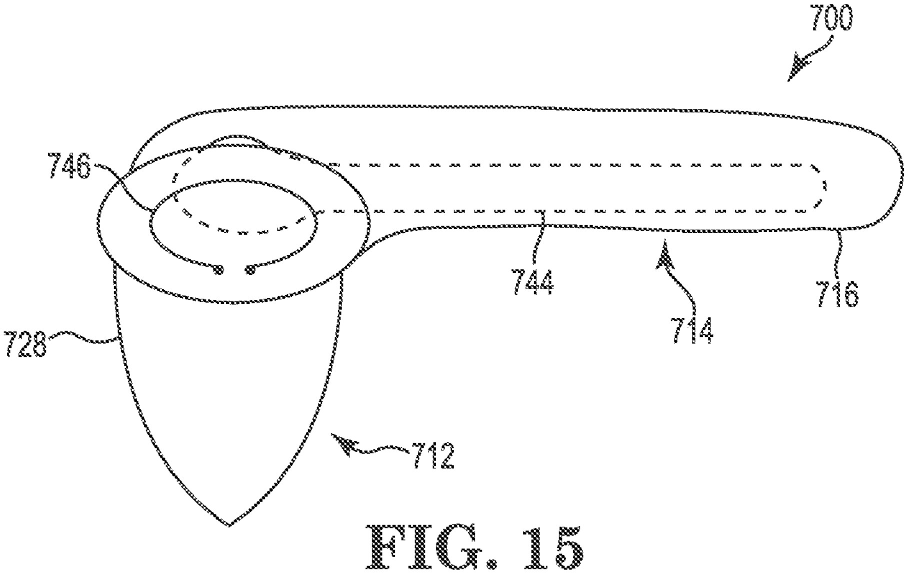
FIG. 15 is a schematic plan view of another embodiment of a hearing device system.

FIG. 15 is a schematic perspective view of another embodiment of a hearing device system 700. All of the design considerations and possibilities described herein regarding the hearing device system 10 of FIGS. 1-5 apply equally to the hearing device system 700 of FIG. 15. The system 700 includes a hearing device 712 and an acoustic tube 714 connected to a housing 728 of the hearing device. The acoustic tube 714 includes antenna 744 disposed on or within body 716 of the acoustic tube. The antenna 744 is a closed loop antenna of any suitable configuration. In one or more embodiments, the antenna 744 can also include a tuning cap (not shown) disposed on or within the body of the acoustic tube 714. The hearing device 712 can also include an antenna 746 disposed on or within the housing 728 of the hearing device. The antenna 746 of the hearing device 712 can be a closed loop antenna as well. The antenna 744 of the acoustic tube 714 can be electromagnetically connected to the antenna 746 of the hearing device 712 using any suitable technique or techniques. In one or more embodiments, the antennas 744, 746 can be inductively coupled using any suitable technique or techniques.

Returning to FIGS. 1-5, the acoustic tube 14 can also include indicia 50, as shown in FIG. 3 that can be disposed on or within the outer surface 17 of the body 16 of the acoustic tube. Any suitable technique or techniques can be utilized to dispose indicia 50 on or within the outer surface 17 of the body 16. The indicia 50 can include any suitable markings or striations. In one or more embodiments, the indicia 50 include notches disposed within the outer surface 17 of the body 16. The notches or indicia can be utilized to remove a portion or portions of the body 16 along such notches or indicia to adjust the length of the acoustic tube 14 as measured along the lumen axis 24. In one or more embodiments, when one or more portions of the body 16 are removed, the magnetic coupler 26 can be repositioned on a newly formed end surface 19 of the first end 18 of the acoustic tube 14 using any suitable technique or techniques.

Figure 3:
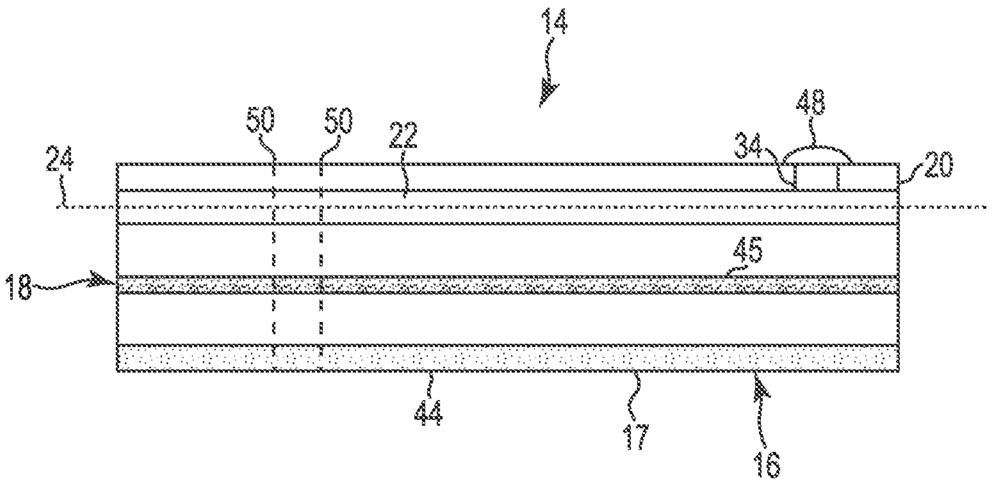
FIG. 3 is a schematic cross-section view of the acoustic tube of FIG. 2.
Figure 4:
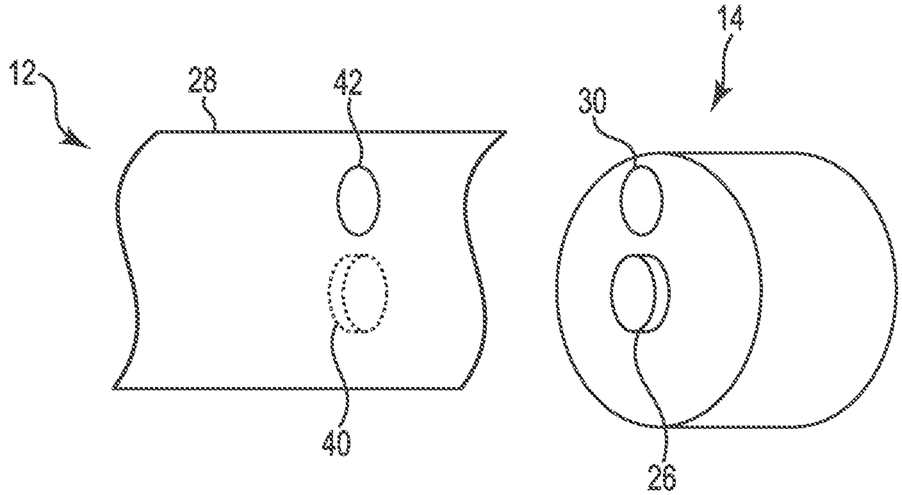
FIG. 4 is a schematic perspective view of a magnetic coupler of the acoustic tube of FIG. 2 and a portion of a housing of a hearing device of the hearing device system of FIG. 1.

Further, a shape-memory material 45 may be disposed within the body 16 of the acoustic tube 14 as shown in FIG. 3. Such shape-memory material 45 can provide rigidity to the acoustic tube 14 and preserve a desired shape of the tube such that the user can position the inlet 34 of the acoustic tube in a desired position relative to the user's mouth 6. Any suitable shape-memory material or materials can be utilized. Further, the shape-memory material 45 can be disposed on or within the body 16 of the acoustic tube 14 using any suitable technique or techniques.

Figure 10:
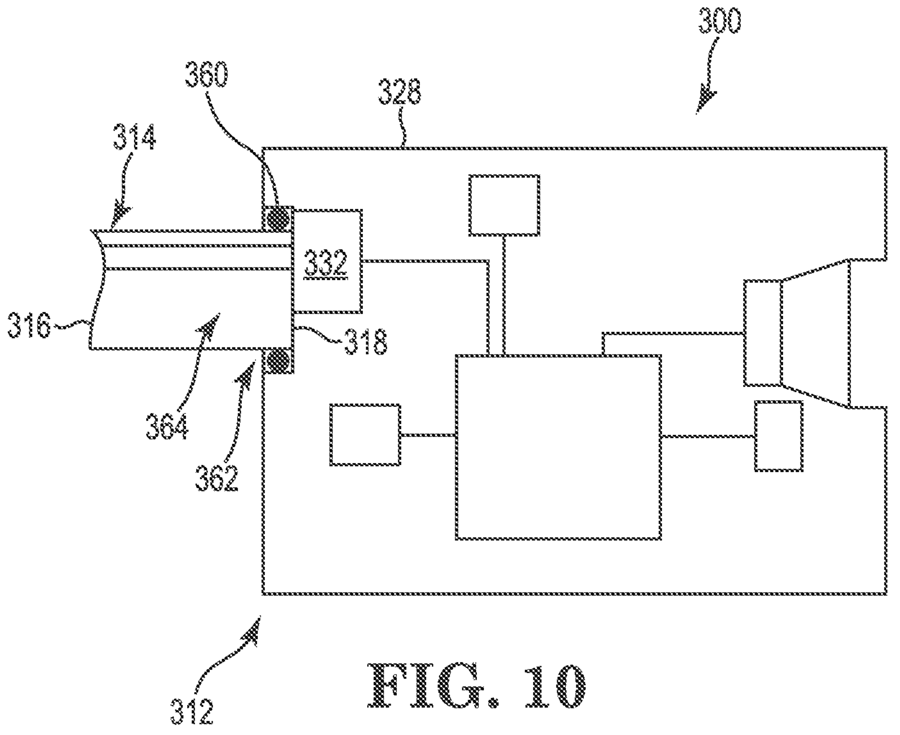
FIG. 10 is a schematic plan view of another embodiment of a hearing device system.

In one or more embodiments, a gasket or gaskets can be disposed adjacent to the first end 18 of the body 16 of the acoustic tube 14 that is adapted to acoustically seal the tube to the housing 28 of the hearing device 12. For example, FIG. 10 is a schematic plan view of another embodiment of a hearing device system 300. All of the design considerations and possibilities described herein regarding the hearing device system 10 of FIGS. 1-5 apply equally to the hearing device system 300 of FIG. 10. A gasket 360 is disposed adjacent to a first end 318 of a body 316 of the acoustic tube 214. The gasket 360 is adapted to acoustically seal the acoustic tube 314 to a housing 328 of a hearing device 312 of hearing device system 300. The gasket 360 provides a friction fit between the acoustic tube 314 and the port 362 (e.g., a microphone or other type of port) of housing 328 of the hearing device 312 such that the acoustic tube is acoustically sealed to the housing when the first end 318 of the body 316 of the tube is disposed within the port 362. Any suitable gasket or gaskets 360 can be utilized to acoustically seal the acoustic tube 314 to the housing 328 of the hearing device 312. Further, the gasket or gaskets 360 can include any suitable material or materials. The gasket 360 can be disposed on the body 316 of the acoustic tube 314 or in the port 362 of the housing 328.

The acoustic tube 14 of FIGS. 1-5 can also include one or more locking mechanisms that can be adapted to engage a locking mechanism of the housing 28 of the hearing device 12 to maintain the connection between the acoustic tube 14 and the housing 28. For example, as shown in FIG. 6, the acoustic tube 114 includes locking mechanism 170 dispose in any suitable location on or at least partially within the body 116 of the acoustic tube. In one or more embodiments, the locking mechanism 170 can be disposed adjacent to the first end 118 of the body 116. The locking mechanism 170 can take any suitable shape or shapes and have any suitable dimensions. In one or more embodiments, the locking mechanism 170 can include a tab 171 that is adapted to be received by a slot 172 disposed on or in the housing 128 of the hearing device 112 as shown in FIG. 7. The tab 171 of the locking mechanism 170 can be inserted into the slot 172 and rotated such that the acoustic tube 114 remains removably connected to the housing 128 of the hearing device. Any suitable locking mechanism or mechanisms can be utilized to removably connect the acoustic tube 114 to the housing 128 of the hearing device 112.

Figure 11:
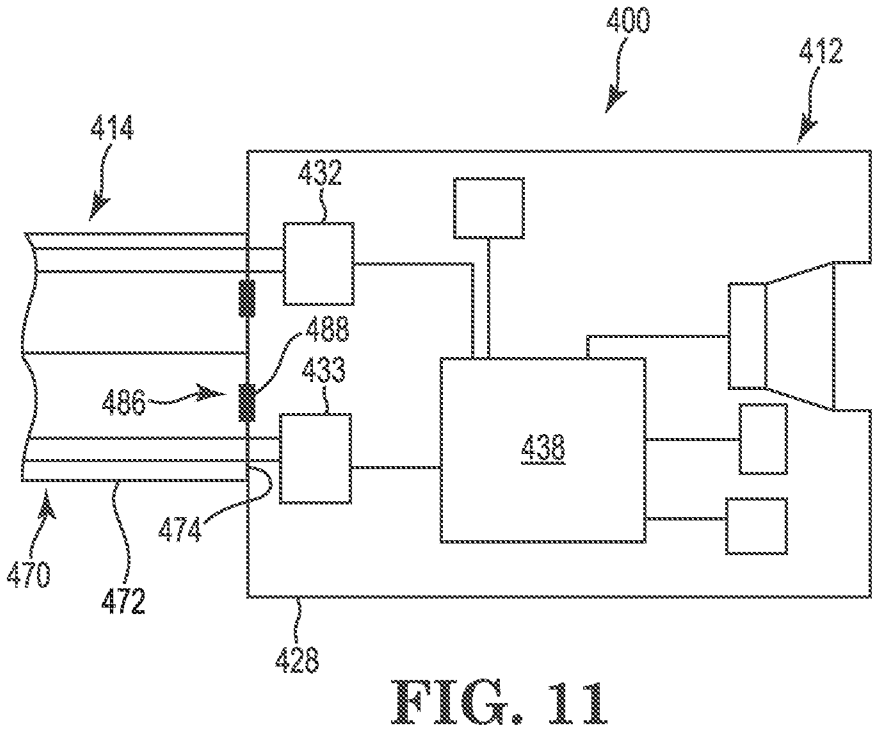
FIG. 11 is a schematic plan view of another embodiment of a hearing device system.
Figure 12:
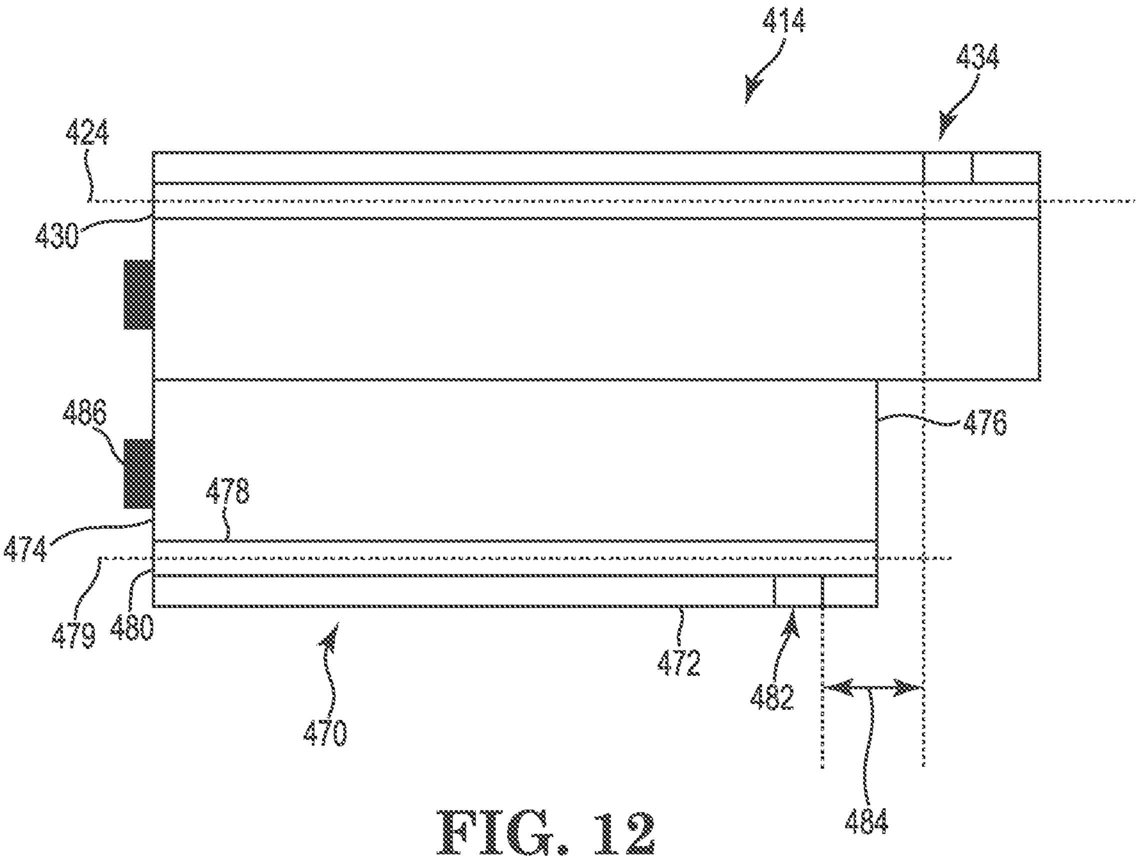
FIG. 12 is a schematic cross-section view of another embodiment of an acoustic tube.

The various hearing device systems described herein can include any suitable number of acoustic tubes. For example, FIG. 11 is a schematic cross-section view of another embodiment of a hearing device system 400. All of the design considerations and possibilities described herein regarding the hearing device system 10 of FIGS. 1-5 apply equally to the hearing device system 400 of FIG. 11. One difference between system 400 of FIG. 11 and system 10 of FIGS. 1-5 is that system 400 includes an acoustic tube 414 and a second acoustic tube 470. As shown in FIG. 12, which is a schematic cross-section view of the acoustic tubes 414, 470 of FIG. 11, the second acoustic tube 470 can include any suitable acoustic tube or tubes, e.g., acoustic tube 14 of FIGS. 1-5. The acoustic tube 414 and the second acoustic tube 470 can be separate tubes or can be connected together using any suitable technique or techniques. The second acoustic tube 470 includes a body 472 having a first end 474 and a second end 476. The second acoustic tube 470 also includes a lumen 478 disposed within the body 472 that extends along a second lumen axis 479 between the first end 474 and the second end 476 of the body. A magnetic coupler 486 is disposed adjacent to the first end 474 of the body 472 and that is adapted to connect the second acoustic tube to a housing 428 of hearing device 412 of system 400. The second acoustic tube 470 also includes an outlet 480 disposed adjacent to the first end 474 of the body 472 that is acoustically connected to the lumen 478. An outlet 430 of the acoustic tube 414 is acoustically connected to microphone 432 of the hearing device 412, and the outlet 480 of the second acoustic tube 470 is acoustically connected to a second microphone 433 of the hearing device.

The first end 474 of the second acoustic tube 470 is connected to the housing 428 of the hearing device 412 using any suitable technique or techniques, e.g., the same techniques described herein regarding acoustic tube 14. As shown in FIG. 11, the magnetic coupler 486 of the second acoustic tube 470 is magnetically connected to magnet 488 of the hearing device 412. In one or more embodiments, the first end 474 of the second acoustic tube 470 is adapted to be disposed within a second port of the housing 428 of the hearing device 412.

The second acoustic tube 470 also includes an inlet 482 disposed adjacent to the second end 476 of the body 472 that is acoustically connected to the lumen 478. The inlet 482 can be adapted to receive acoustic energy from a mouth of a user in a similar manner as inlet 34 of acoustic tube 14 of FIGS. 1-5. The second acoustic tube 470 can be adapted to direct the acoustic energy received by the inlet 482 through the lumen 478 and the outlet 480 to the second microphone 433 of the hearing device 412. Inlet 434 of acoustic tube 414 is disposed at a selected distance 484 from the inlet 482 of the second acoustic tube 470 as measured in a direction parallel to lumen axis 424 of the first acoustic tube 414. Distance 484 can be any suitable distance.

Figure 16:
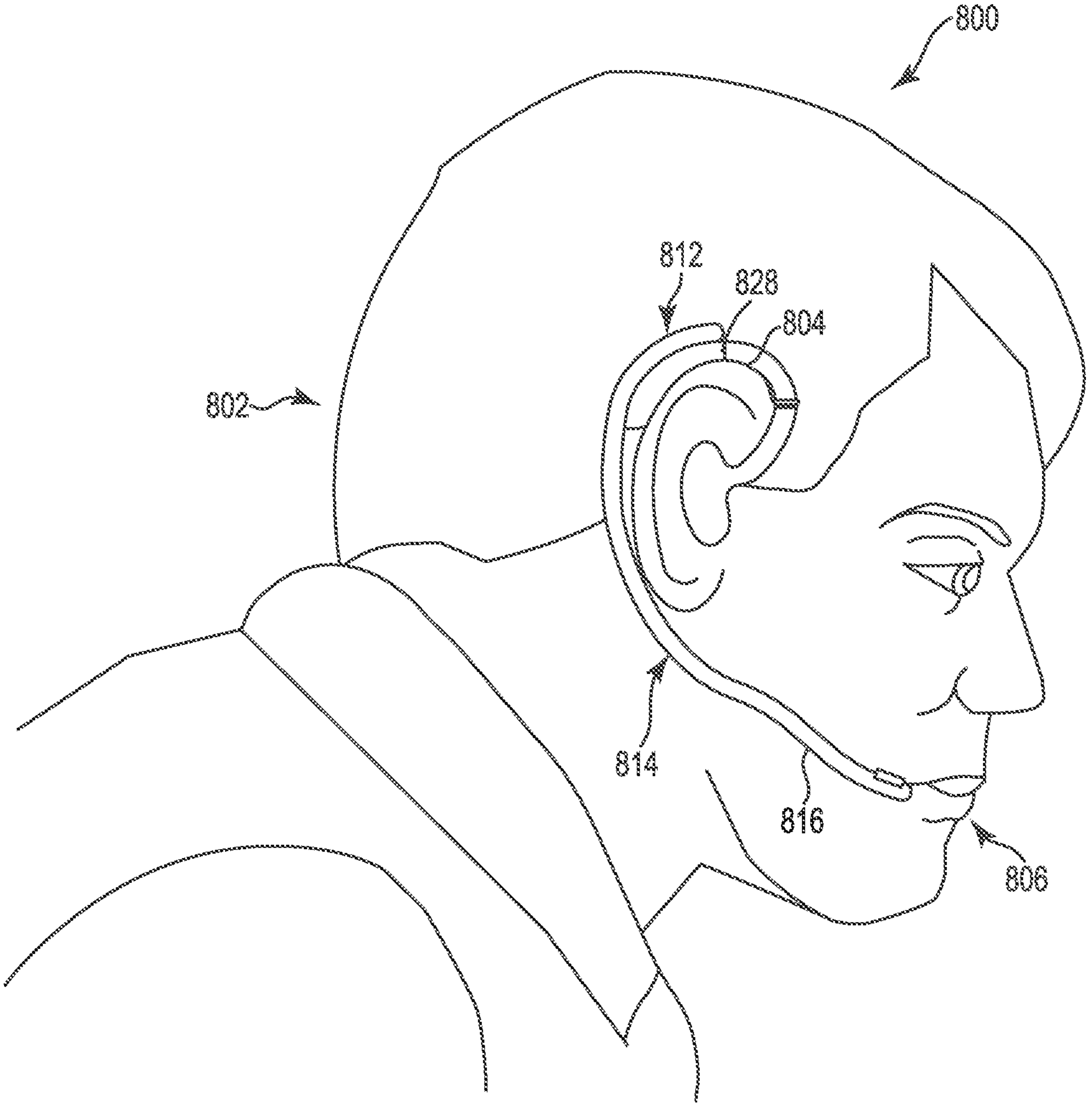
FIG. 16 is a schematic perspective view of another embodiment of a hearing device system.
Figure 17:
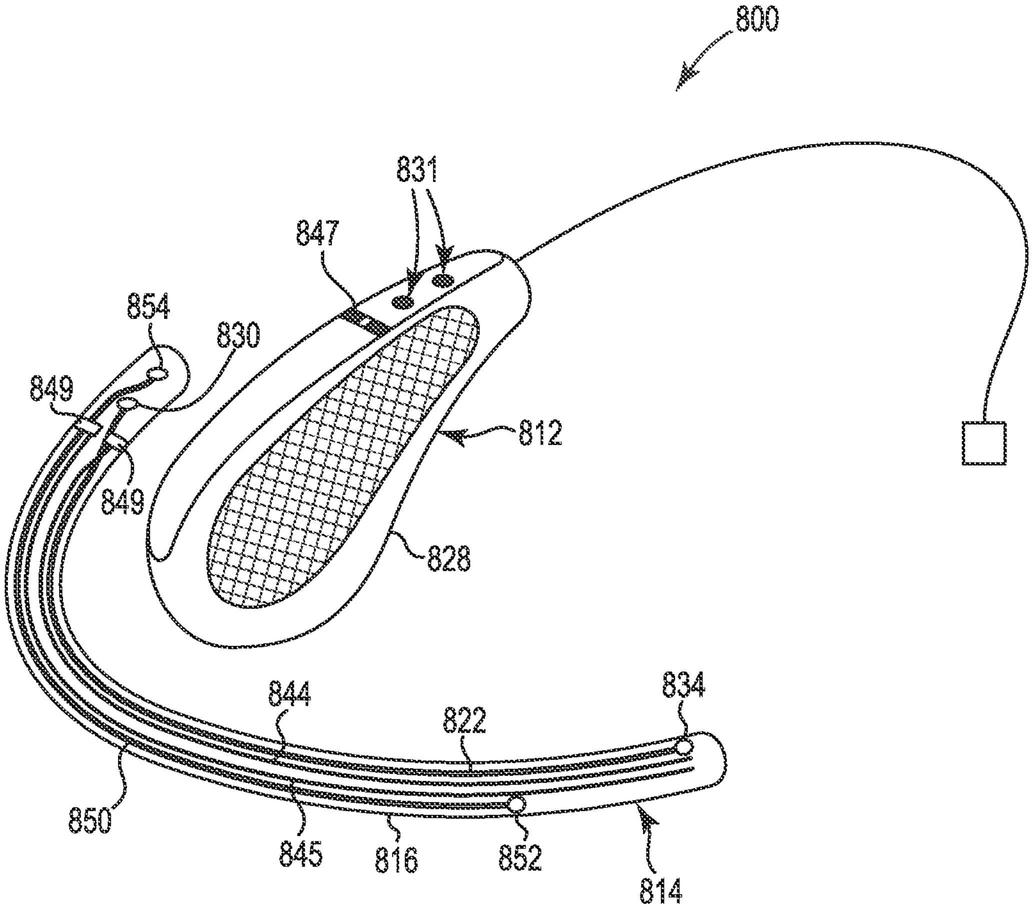
FIG. 17 is a schematic perspective view of another embodiment of a hearing device system.

In general, the various embodiments of acoustic tubes described herein can be connected to any suitable hearing device. For example, FIGS. 16-17 are perspective views of another embodiment of a hearing device system 800. All of the design considerations and possibilities described herein regarding the hearing device system 10 of FIGS. 1-5 apply equally to the hearing device system 800 of FIGS. 16-17. One difference between system 800 and system 10 is that system 800 includes a behind-the-ear hearing device 812 that is adapted to be disposed behind an ear 804 of a user 802. The hearing device 812 includes a housing 828 and an acoustic tube 814 acoustically connected to the housing. The acoustic tube 814 can include any suitable acoustic tube described herein, e.g., acoustic tube 14 of FIGS. 1-5 or acoustic tube 214 of FIGS. 8-9. The acoustic tube 814 is shown in FIG. 17 as transparent for clarity. The acoustic tube 814 includes a first antenna element 844 and a second antenna element 845 disposed on or within a body 816 of the acoustic tube. In one or more embodiments, the antenna elements 844, 845 can be electromagnetically coupled to one or more internal antenna elements of the hearing device (not shown), or ohmically connected or capacitively coupled, to antenna feed points 847 disposed on or within the housing 828 of the hearing device via antenna pads 849. The acoustic tube 814 also includes a lumen 822 and a second lumen 850. The lumens 822, 850 can be acoustically connected to one or more microphones disposed within the housing 828 at microphone ports 831 via outlets 830 and 854 respectively using any suitable technique or techniques. The lumen 822 connects an inlet 234 to a microphone, and the second lumen 850 connects second inlet 852 to a second microphone.

The acoustic tube 814 can be mechanically connected to the housing 828 of the hearing device using any suitable technique or techniques, e.g., a magnetic coupler can be disposed on or within the body 816 of the acoustic tube that magnetically connects the acoustic tube to one or more magnets disposed on or within the housing. In one or more embodiments, the acoustic tube 814 can be adapted to wrap around at least a portion of the housing 828 when connected to the hearing device 812 and down around a lower portion of the ear 804 of the user 802 such that it extends to a mouth 806 of the user, where inlet 834 of lumen 822 and inlet 852 of lumen 850 are positioned such that they can receive acoustic energy therefrom.

Figure 18:
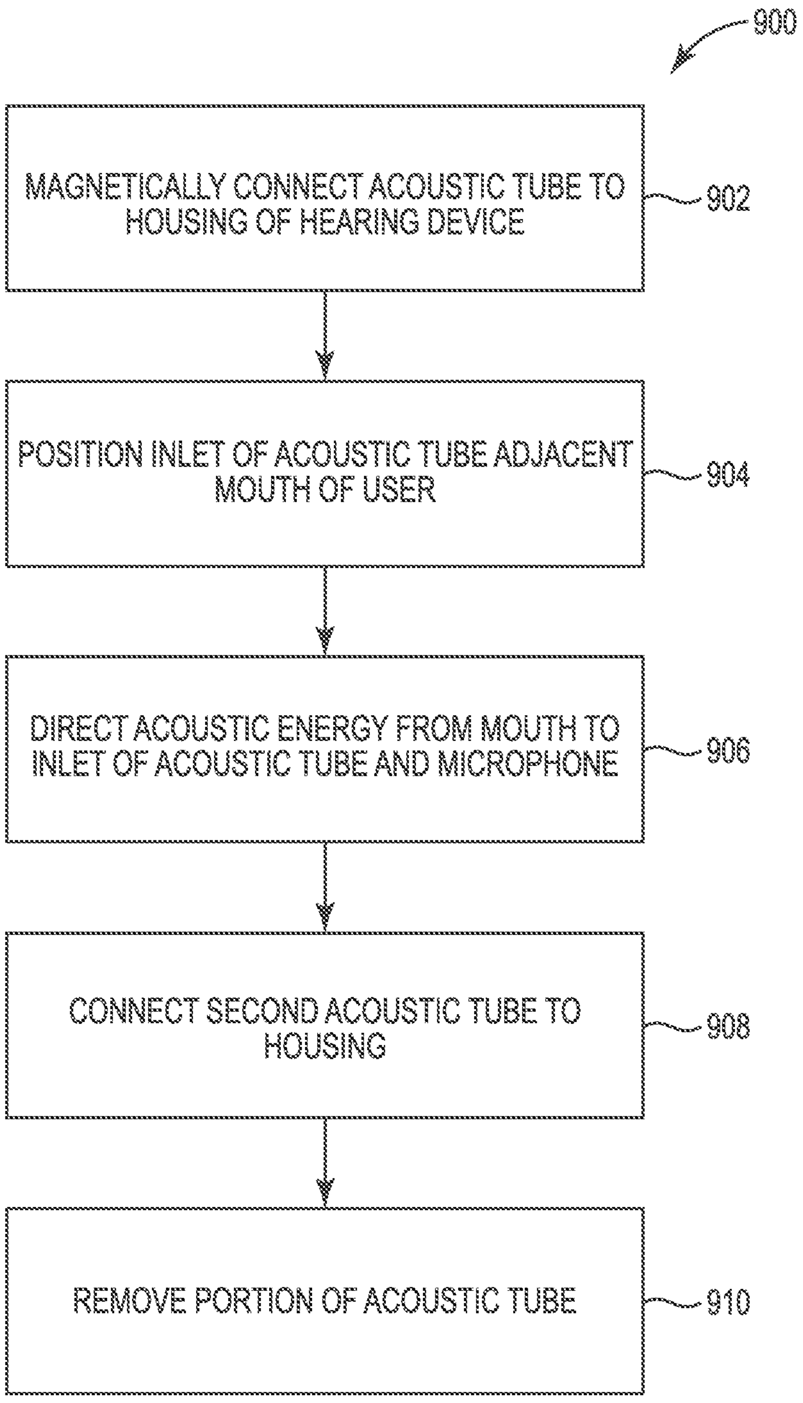
FIG. 18 is a flowchart of one embodiment of a method of forming the hearing device system of FIG. 1.

Any suitable technique or techniques can be utilized with the various embodiments of hearing device systems described herein such that these systems can be utilized by a user. For example, FIG. 18 is a flowchart of one embodiment of a method 900 of utilizing hearing device system 10 of FIGS. 1-5. Although described regarding system 10, the method 900 can be utilized with any suitable hearing device system. At 902, the acoustic tube 14 can be magnetically connected to the housing 28 of the hearing device 12 using any suitable technique or techniques such that the outlet 30 of the acoustic tube is acoustically connected to the microphone 32 disposed within the housing of the hearing device. The inlet 34 of the acoustic tube 14 can be positioned adjacent to the mouth 6 of the user 2 using any suitable technique or techniques at 904. Acoustic energy from the mouth 6 of the user 2 can be directed from the inlet 34 of the acoustic tube 14 to the microphone 32 through the outlet 30 of the acoustic tube at 906. Further, at 908, a second acoustic tube (e.g., a second acoustic tube 470 of hearing device system 400 of FIGS. 11-12) can optionally be connected to the housing 28 of the hearing device 12 such that an outlet of the second acoustic tube is acoustically connected to a second microphone (e.g., second microphone 433 of hearing device system 400) disposed within the housing 28. An inlet (e.g., inlet 434) of the second acoustic tube can be disposed adjacent to the mouth 6 of the user 2 at a selected distance from the inlet 34 of the acoustic tube 14 as measured in a direction along the lumen axis 24 of the lumen 22 of the acoustic tube. In one or more embodiments, the controller 38 can be utilized to determine a time delay between an acoustic signal representative of acoustic energy received from the mouth 6 of the user 2 to the microphone 32 by the acoustic tube 14 and a second acoustic signal representative of acoustic energy received from the mouth of the user to the second microphone by the second acoustic tube. Further, in one or more embodiments, a portion of the acoustic tube 14 adjacent to the second end 20 of the tube (e.g., along indicia 50 of FIG. 3) can be removed at 910 using any suitable technique or techniques such that the inlet 34 of the tube is disposed at a selected distance from the mouth 6 of the user 2 at 910.

All references and publications cited herein are expressly incorporated herein by reference in their entirety into this disclosure, except to the extent they may directly contradict this disclosure. Illustrative embodiments of this disclosure are discussed, and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. An acoustic tube comprising:
- a body comprising a first end and a second end;
- a lumen disposed within the body that extends along a lumen axis between the first end and second end;
- a magnetic coupler disposed adjacent to the first end of the body and adapted to connect the acoustic tube to a housing of a hearing device;
- an outlet disposed adjacent to the first end of the body and acoustically connected to the lumen, wherein the outlet is adapted to be acoustically connected to a microphone of the hearing device; and
- an inlet disposed adjacent to the second end of the body and acoustically connected to the lumen, wherein the inlet is adapted to receive acoustic energy from a mouth of a user;
- wherein the acoustic tube is adapted to direct the acoustic energy received by the inlet through the lumen and the outlet to the microphone of the hearing device.

2. The acoustic tube of claim 1, further comprising a second lumen disposed within the body that extends along a second lumen axis.

3. The acoustic tube of claim 1, further comprising an antenna disposed on or within the body, wherein the antenna is adapted to be electrically connected or coupled to a wireless antenna of the hearing device.

4. The acoustic tube of claim 1, wherein the magnetic coupler is disposed within an end surface of the first end of the body.

5. The acoustic tube of claim 1, further comprising a locking mechanism disposed adjacent to the first end of the body of the acoustic tube, wherein the locking mechanism is adapted to engage a locking mechanism of the housing of the hearing device such that the acoustic tube is removably connected to the housing of the hearing device.

6. The acoustic tube of claim 1, further comprising a shape memory material disposed within the body.

7. The acoustic tube of claim 1, further comprising a gasket disposed adjacent to the first end of the body, wherein the gasket is adapted to acoustically seal the acoustic tube to the housing of the hearing device.

8. The acoustic tube of claim 1, wherein the first end of the body is adapted to be disposed within a microphone port of the housing of the hearing device.

9. A hearing device system comprising:
- a hearing device comprising a housing and a microphone disposed within the housing; and
- an acoustic tube acoustically connected to the microphone, wherein the acoustic tube comprises:
  - a body comprising a first end and a second end;
  - a lumen disposed within the body that extends along a lumen axis between the first end and second end;
  - a magnetic coupler disposed adjacent to the first end of the body and adapted to connect the acoustic tube to the housing of the hearing device;
  - an outlet disposed adjacent to the first end of the body and acoustically connected to the lumen, wherein the acoustic tube is acoustically connected to the microphone through the outlet; and
  - an inlet disposed adjacent to the second end of the body and acoustically connected to the lumen, wherein the inlet is adapted to receive acoustic energy from a mouth of a user;
  - wherein the acoustic tube is adapted to direct the acoustic energy received by the inlet through the lumen and the outlet to the microphone of the hearing device.

10. The system of claim 9, wherein the hearing device is adapted to be disposed at least partially within an ear canal of the user.

11. The system of claim 9, wherein the housing further comprises a port, wherein the first end of the acoustic tube is adapted to be disposed within the port.

12. The system of claim 9, wherein the hearing device further comprises a magnet that is adapted to magnetically connect the housing to the magnetic coupler of the acoustic tube.

13. The system of claim 12, wherein the magnet of the hearing device comprises a recharging magnet that is further adapted to magnetically connect the hearing device to a charging base.

14. The system of claim 9, further comprising a second acoustic tube that is adapted to be acoustically connected to the hearing device, wherein the second acoustic tube comprises:

a body comprising a first end and a second end;

a lumen disposed within the body that extends along a lumen axis between the first end and second end;

a magnetic coupler disposed adjacent to the first end of the body and adapted to connect the second acoustic tube to the housing of the hearing device;

an outlet disposed adjacent to the first end of the body and acoustically connected to the lumen, wherein the second acoustic tube is acoustically connected to the microphone; and an inlet disposed adjacent to the second end of the body and acoustically connected to the lumen, wherein the inlet is adapted to receive acoustic energy from the mouth of a user;

wherein the second acoustic tube is adapted to direct the acoustic energy received by the inlet through the lumen and the outlet to a second microphone of the hearing device.

15. The system of claim 14, wherein the inlet of the acoustic tube is disposed at a selected distance from the inlet of the second acoustic tube as measured in a direction parallel to the lumen axis of the acoustic tube.

16. The system of claim 9, wherein the magnetic coupler comprises a magnet.

17. The system of claim 9, wherein the first end of the body of the acoustic tube is adapted to be disposed within a microphone port of the housing of the hearing device.

18. A method comprising:

magnetically connecting an acoustic tube to a housing of a hearing device such that an outlet of the acoustic tube is acoustically connected to a microphone disposed within the housing;

positioning an inlet of the acoustic tube adjacent to a mouth of a user; and directing acoustic energy from the mouth of the user from the inlet of the acoustic tube to the microphone through the outlet of the acoustic tube.

19. The method of claim 18, further comprising:

connecting a second acoustic tube to the housing of the hearing device such that an outlet of the second acoustic tube is acoustically connected to a second microphone disposed within the housing;

positioning an inlet of the second acoustic tube adjacent to the mouth of the user at a selected distance from the inlet of the acoustic tube as measured in a direction along a lumen axis of a lumen of the acoustic tube; and determining a time delay between an acoustic signal transmitted from a mouth of a user to the microphone by the acoustic tube and a second acoustic signal transmitted from the mouth of the user to the second microphone by the second acoustic tube.

20. The method of claim 18, further comprising removing a portion of the acoustic tube adjacent to a second end of the tube such that the inlet of the tube is disposed at a selected distance from the mouth of the user.

* * * * *